United States Patent
Kurtz et al.

(10) Patent No.: US 10,657,419 B2
(45) Date of Patent: May 19, 2020

(54) MACHINE VISION AND ROBOTIC INSTALLATION SYSTEMS AND METHODS

(71) Applicant: The Boeing Company, Chicago, IL (US)

(72) Inventors: Tyler Edward Kurtz, Summerville, SC (US); Riley Harrison HansonSmith, Bothell, WA (US)

(73) Assignee: The Boeing Company, Chicago, IL (US)

( * ) Notice: Subject to any disclaimer, the term of this patent is extended or adjusted under 35 U.S.C. 154(b) by 216 days.

(21) Appl. No.: 15/939,127

(22) Filed: Mar. 28, 2018

(65) Prior Publication Data
US 2019/0303721 A1 Oct. 3, 2019

(51) Int. Cl.
*G06K 9/00* (2006.01)
*G06K 9/62* (2006.01)
(Continued)

(52) U.S. Cl.
CPC .......... *G06K 9/6262* (2013.01); *B23P 19/04* (2013.01); *B23P 19/10* (2013.01); *B23P 19/105* (2013.01);
(Continued)

(58) Field of Classification Search
CPC .......... G06K 9/00201; G06K 9/00208; G06K 9/00214; G06K 9/00496; G06K 9/00503;
(Continued)

(56) References Cited

U.S. PATENT DOCUMENTS 5,579,444 A * 11/1996 Dalziel ................. B25J 9/1669
382/153
5,727,300 A 3/1998 Ekdahl et al.
(Continued)

FOREIGN PATENT DOCUMENTS

EP 2138861 12/2009
GB 2204814 11/1988
(Continued)

OTHER PUBLICATIONS

Manabu Hashimoto, Tetsuji Haga, and Kazuhiko Sumi, "Vision System for Object Handling Robot Using a Low-Resolution Range Image and an Intensity Image", Systems and Computers in Japan, vol. 33, No. 7, 2002, pp. 21-29 (Year: 2002).*
(Continued)

*Primary Examiner* — Eric Rush
(74) *Attorney, Agent, or Firm* — Dascenzo Intellectual Property Law, P.C.

(57) ABSTRACT

Machine vision methods and systems determine if an object within a work field has one or more predetermined features. Methods comprise capturing image data of the work field, applying a filter to the image data, in which the filter comprises an aspect corresponding to a specific feature, and based at least in part on the applying, determining if the object has the specific feature. Systems comprise a camera system configured to capture image data of the work field, and a controller communicatively coupled to the camera system and comprising non-transitory computer readable media having computer-readable instructions that, when executed, cause the controller to apply a filter to the image data, and based at least in part on applying the filter, determine if the object has the specific feature. Robotic installation methods and systems that utilize machine vision methods and systems also are disclosed.

20 Claims, 4 Drawing Sheets

(51) Int. Cl.
*G06T 1/00* (2006.01)
*G06T 7/00* (2017.01)
*B23P 19/10* (2006.01)
*G06K 9/46* (2006.01)
*G06K 9/40* (2006.01)
*B23P 19/04* (2006.01)
*G06N 20/00* (2019.01)

(52) U.S. Cl.
CPC ..... *G06K 9/00503* (2013.01); *G06K 9/00664* (2013.01); *G06K 9/40* (2013.01); *G06K 9/4614* (2013.01); *G06K 9/4652* (2013.01); *G06K 9/4671* (2013.01); *G06K 9/6255* (2013.01); *G06T 1/0014* (2013.01); *G06T 7/0006* (2013.01); *G05B 2219/40565* (2013.01); *G06K 2209/19* (2013.01); *G06N 20/00* (2019.01); *G06T 2207/10012* (2013.01); *G06T 2207/30164* (2013.01)

(58) Field of Classification Search
CPC .... G06K 9/0051; G06K 9/00664; G06K 9/34; G06K 9/342; G06K 9/36; G06K 9/40; G06K 9/46; G06K 9/4609; G06K 9/4614; G06K 9/4638; G06K 9/4652; G06K 9/4671; G06K 9/6201; G06K 9/6255; G06K 9/6262; G06K 2209/19; G06K 2209/21; G06K 2209/40; G06K 2209/401; G06T 1/0014; G06T 7/0004; G06T 7/0006; G06T 7/001; G06T 7/10; G06T 7/11; G06T 7/136; G06T 7/174; G06T 7/40; G06T 7/44; G06T 7/50; G06T 7/593; G06T 7/70; G06T 7/73; G06T 7/74; G06T 7/75; G06T 7/90; G06T 2207/10012; G06T 2207/30164; G06N 20/00; B23P 19/04; B23P 19/06; B23P 19/08; B23P 19/082; B23P 19/10; B23P 19/105; B23P 19/12; B25J 9/1602; B25J 9/161; B25J 9/1697; G05B 2219/37205; G05B 2219/39084; G05B 2219/39391; G05B 2219/39393; G05B 2219/39543; G05B 2219/40; G05B 2219/40033; G05B 2219/40053; G05B 2219/40543; G05B 2219/40554; G05B 2219/40563; G05B 2219/40564; G05B 2219/40565
USPC ....... 382/100, 103, 108, 141, 151–154, 159, 382/162–165, 173, 190, 199, 203, 209, 382/217, 218, 224, 254, 260, 274–276, 382/291; 700/28–30, 55–59, 95, 114, 700/117, 213, 245, 259; 901/1, 2, 47; 348/42, 47, 86, 91, 94, 95, 135, 142
See application file for complete search history.

(56) References Cited

U.S. PATENT DOCUMENTS

| | | | |
|---|---|---|---|
| 6,167,607 | B1 | 1/2001 | Pryor |
| 6,328,523 | B1* | 12/2001 | Watanabe ............. B25J 9/1687 198/396 |
| 6,448,549 | B1* | 9/2002 | Safaee-Rad ........ G01N 21/9054 356/239.4 |
| 7,362,437 | B2 | 4/2008 | Engelbart et al. |
| 7,755,761 | B2 | 7/2010 | Mathis et al. |
| 8,050,486 | B2 | 11/2011 | Walton |
| 8,224,121 | B2 | 7/2012 | Safai et al. |
| 8,978,967 | B2 | 3/2015 | Gamboa et al. |
| 9,299,118 | B1 | 3/2016 | McGraw |
| 9,302,785 | B2 | 4/2016 | Buckus et al. |
| 9,568,906 | B2 | 2/2017 | Trautman et al. |
| 9,761,002 | B2 | 9/2017 | Mundhenk et al. |
| 9,789,549 | B2 | 10/2017 | Nguyen et al. |
| 10,002,431 | B2* | 6/2018 | Sridhar ................... G06K 9/28 |
| 2005/0094868 | A1* | 5/2005 | Jones, Jr. ............. G06K 9/2036 382/152 |
| 2007/0188606 | A1 | 8/2007 | Atkinson et al. |
| 2008/0181485 | A1* | 7/2008 | Beis ....................... B25J 9/1697 382/153 |
| 2010/0324737 | A1* | 12/2010 | Handa .................... G06K 9/626 700/259 |
| 2012/0059517 | A1* | 3/2012 | Nomura ................. B25J 9/1612 700/259 |
| 2013/0100256 | A1* | 4/2013 | Kirk ........................ G06T 7/593 348/48 |
| 2013/0218324 | A1* | 8/2013 | Furuya .................. B25J 9/1687 700/192 |
| 2013/0266205 | A1* | 10/2013 | Valpola .................... G06K 9/78 382/153 |
| 2015/0217451 | A1* | 8/2015 | Harada .................. B25J 9/1612 700/253 |
| 2017/0074755 | A1* | 3/2017 | Adiga ................... G06T 7/0004 |
| 2017/0219336 | A1 | 8/2017 | Kurtz et al. |
| 2018/0107895 | A1* | 4/2018 | Beller ..................... G06K 9/628 |
| 2018/0126553 | A1* | 5/2018 | Corkum ................ B25J 9/0081 |
| 2019/0272411 | A1* | 9/2019 | Zou ........................... G06T 7/74 |

FOREIGN PATENT DOCUMENTS

| | | |
|---|---|---|
| GB | 2486658 | 6/2012 |
| WO | WO03/034165 | 4/2003 |

OTHER PUBLICATIONS

European Patent Office, Partial European Search Report for related European Patent Application No. 19157351, dated Aug. 25, 2019.
European Patent Office, Extended European Search Report for related European Patent Application No. 19157351, dated Dec. 18, 2019.
Zhao et al., "Robust background subtraction in HSV color space," Proceedings of SPIE, vol. 4861, pp. 325-332, XP055651592, Dec. 1, 2002.
Mehrotra et al., "Gabor Filter-Based Edge Detection," Pattern Recognition, vol. 25, No. 12, pp. 1479-1494, XP000336458, Dec. 1, 1992.

* cited by examiner

MACHINE VISION AND ROBOTIC INSTALLATION SYSTEMS AND METHODS

FIELD

The present disclosure relates to machine vision.

BACKGROUND

Manufacturing is becoming increasingly more automated. Current robotic manufacturing systems are very efficient at repetitive tasks; however, they do not necessarily adapt to changing environments or to mistakes that are introduced by personnel or other upstream inputs. For example, a nut running robot (e.g., a robotic arm with a nut installation end effector) that is tasked with installation of nuts onto threaded fasteners will install a nut on an incorrectly sized or configured threaded fastener, resulting in human personnel having not only to recognize the mistake but also to subsequently fix the mistake.

SUMMARY

Machine vision and robotic installation systems and methods are disclosed.

Automated machine vision methods according to the present disclosure for determining if an object within a work field has one or more predetermined features comprise capturing image data of the work field from a camera system, applying a filter to the image data to create filtered data, in which the filter comprises an aspect corresponding to a specific feature of the one or more predetermined features, and based at least in part on the applying, determining if the object has the specific feature. Robotic installation methods according to the present disclosure comprise performing an automated machine vision method according to the present disclosure, in which the camera system is mounted to, mounted with, or mounted as an end effector of a robotic arm, and based on the determining, installing, using the robotic arm, a component in a predetermined configuration relative to the object.

Machine vision systems according to the present disclosure for determining if an object within a work field has one or more predetermined features comprise a camera system configured to capture image date of the work field, and a controller communicatively coupled to the camera system to receive the image data from the camera system. The controller comprises non-transitory computer readable media having computer-readable instructions that, when executed, cause the controller to apply a filter to the image data to create filtered data, in which the filter comprises an aspect corresponding to a specific feature of the one or more predetermined features, and based at least in part on applying the filter, determine if the object has the specific feature. Robotic installation systems according to the present disclosure comprise a machine vision system according to the present disclosure and a robotic arm, with the camera system mounted to, mounted with, or mounted as an end effector of the robotic arm. The robotic arm is configured to install a component in a predetermined configuration relative to the object based in part on a determination by the controller that the object has the specific feature.

DESCRIPTION

Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
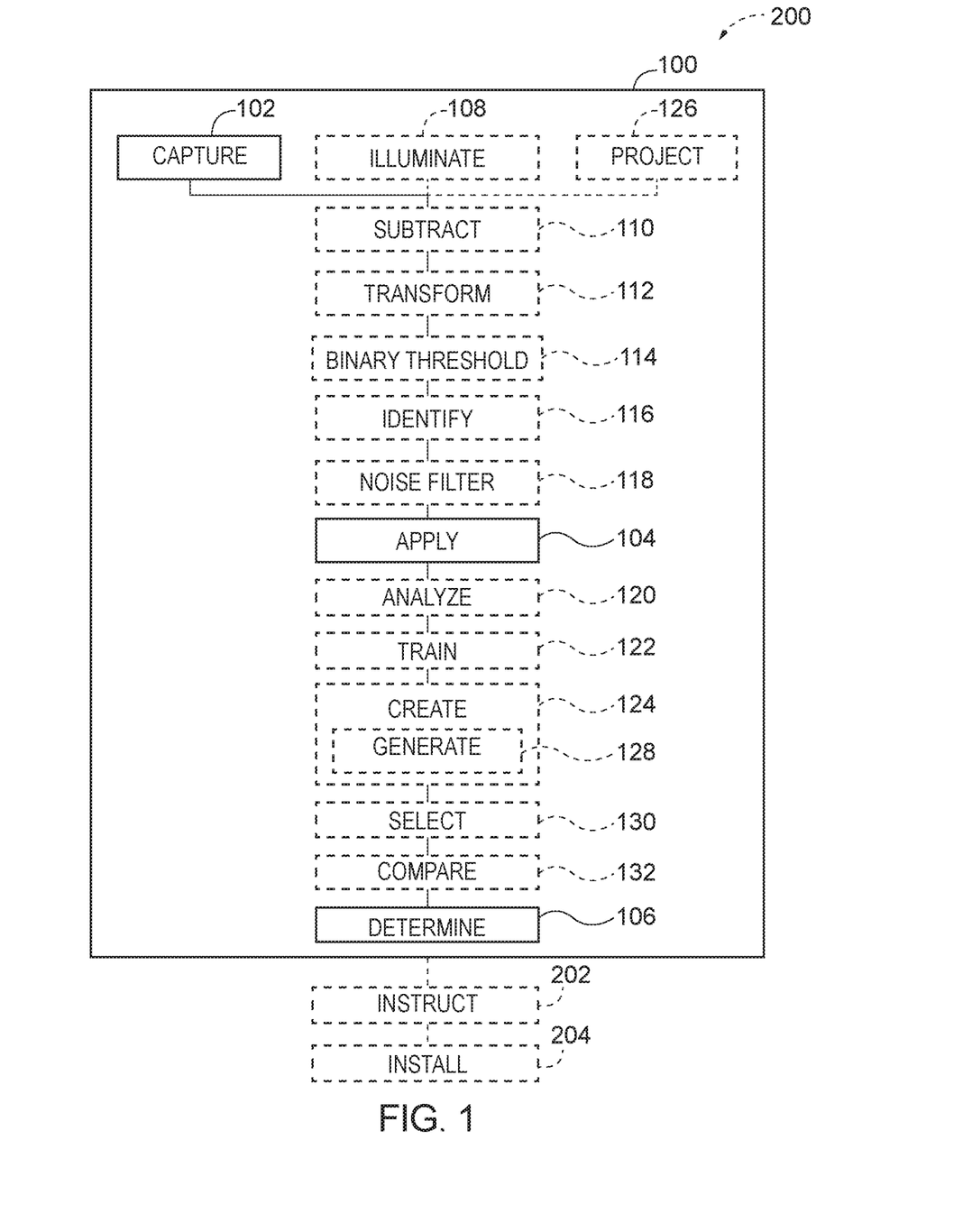
FIG. 1 is a flowchart schematically representing methods according to the present disclosure.
Figure 2:
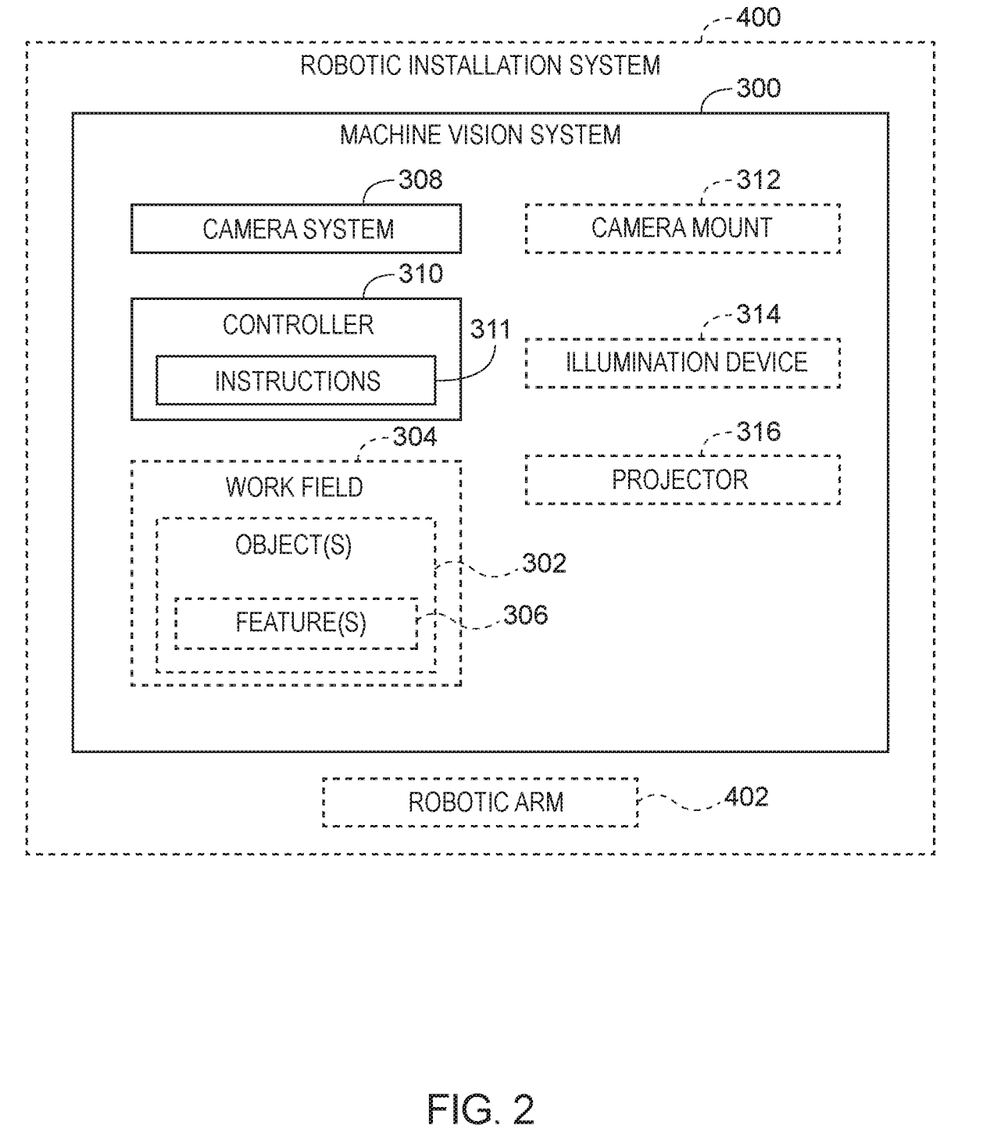
FIG. 2 is a diagram schematically representing systems according to the present disclosure.

Machine vision and robotic installation systems and methods are disclosed herein. FIG. 1 provides a flowchart schematically representing automated machine vision methods 100 for determining if an object 302 within a work field 304 has one or more predetermined features 306, and FIG. 2 provides a schematic representation of machine vision systems 300 for determining if an object 302 within a work field 304 has one or more predetermined features 306. The schematic representation of methods 100 and systems 300 in FIGS. 1 and 2 are not limiting and other methods 100, steps of methods 100, systems 300, and elements of systems 300 are within the scope of the present disclosure, including methods 100 having greater than or fewer than the number of illustrated steps, as well as systems 300 having great than or fewer than the number of illustrated elements, as understood from the discussions herein. As also understood from the discussions herein, methods 100 are not required to have the schematically represented steps of FIG. 1 performed in the order illustrated. Systems 300 may be described as being configured to perform or implement a method 100 according to the present disclosure; however, not all methods 100 are required to be performed or implemented by a system 300 according to the present disclosure, and not all systems 300 are required to perform or implement a method 100 according to the present disclosure.

As mentioned, methods 100 and systems 300 determine if an object 302 within a work field 304 has one or more predetermined features 306 (e.g., physical or structural features or specific location or orientation of the object 302). Accordingly, by confirming that features 306 of the object 302 are features that are expected to be present, or otherwise correspond to an object that is desired to be present at the location of the object 302, methods 100 and systems 300 may make a determination if the object 302 is the correct object, for example, and ready to be worked on by a subsequent operation. Additionally or alternatively, methods 100 and systems 300 may make a determination if the object 302 is in a desired configuration, such as being fully installed, properly positioned, assembled with a distinct component, etc. Conversely, if a method 100 or system 300 determines that features of the object 302 are not the features 306 expected to be present, or otherwise correspond to an object, or configuration thereof, that is desired to be present at the location of the object 302, a subsequent operation may be avoided or an alternative operation may be performed, such as by replacing the object 302 with the correct object, by further manipulating the object 302 prior to subsequent processing, etc. Accordingly, some methods 100 and systems 300 may be described as quality control methods and systems.

Methods 100 and systems 300 may be described as automated methods and systems, in so far as upon initiation or activation, the steps necessary to result in the ultimate goal of a method 100 or a system 300 may be fully automated by a system or its component parts without requiring external input from a human user.

Work field 304 may be any appropriate work field, such as in a manufacturing or production environment. As illustrative, non-exclusive examples, a work field 304 may comprise a product, or portion thereof, such as a vehicle, an aircraft, or a machine, in a stage of assembly or manufacture. As a more specific example, a work field 304 may comprise a region of a product in which fasteners are installed to assemble two or more components together. In such an example, objects 302 may comprise fasteners; however, methods 100 and systems 300 may be implemented with or configured for any suitable configuration of objects 302.

With specific reference to FIG. 1 and general reference to FIG. 2, methods 100 comprise capturing 102 image data of the work field 304 from a camera system 308, applying 104 a filter to the image data to create filtered data, in which the filter comprises an aspect corresponding to a specific feature of the one or more predetermined features 306, and based at least in part on the applying 104, determining 106 if the object 302 has the specific feature. In other words, image data associated with the work field 304 is captured, a filter having an aspect that corresponds to a specific feature is applied to the image data, and from the filtered image data, a determination is made whether or not the object 302 has the specific feature. As an illustrative, non-exclusive example, when the object 302 is a threaded fastener, the filter may have an aspect that corresponds to a thread configuration (e.g., thread pitch) of an object that is expected to be where the object 302 is positioned, and as a result of the filtering, it is determined whether or not the threaded fastener has the thread pitch that is expected to be present.

With specific reference to FIG. 2, systems 300 comprise a camera system 308 that is configured to capture image data of the work field 304, and a controller 310 communicatively coupled to the camera system 308 to receive the image data from the camera system 308. The controller 310 may be described as being configured to perform or implement methods 100 according to the present disclosure. Additionally or alternatively, the controller 310 may comprise non-transitory computer readable media having computer-readable instructions that, when executed, cause the controller to apply a filter to the image data to create filtered data, in which the filter comprises an aspect corresponding to a specific feature of the one or more predetermined features 306, and based at least in part on application of the filter, determine if the object 302 has the specific feature.

A controller 310 may be any suitable device or devices that are configured to perform the functions of controllers 310 discussed herein. For example, a controller 310 may include one or more of an electronic controller, a dedicated controller, a special-purpose controller, a personal computer, a special-purpose computer, a display device, a logic device, a memory device, and/or a memory device having computer readable media suitable for storing computer-executable instructions for implementing aspects of systems and/or methods according to the present disclosure. Additionally or alternatively, controllers 310 may include, or be configured to read, non-transitory computer readable storage, or memory, media suitable for storing computer-executable instructions, or software, for implementing methods or steps of methods according to the present disclosure. Examples of such media include CD-ROMs, disks, hard drives, flash memory, etc. As used herein, storage, or memory, devices and media having computer-executable instructions as well as computer-implemented methods and other methods according to the present disclosure are considered to be within the scope of subject matter deemed patentable in accordance with Section 101 of Title 35 of the United States Code.

In some examples of methods 100 and systems 300, the camera system 308 is positioned in a known or determined position and orientation relative to the work field 304. For example, the size, shape, and orientation of the object 302 from the perspective of the camera system 308 effects the captured image data (e.g., the collection of pixels corresponding to the object 302) and thus the corresponding analysis of the image data for making the determination of whether the object 302 has a specific feature. Accordingly, coordinate systems associated with the camera system 308 and the work field 304 need to be aligned or at least coordinated in a known manner for operative implementation of methods 100 and systems 300 according to these examples. Accordingly, some methods 100 may be described as further comprising determining, or acquiring, a position and/or an orientation of the camera system 308 relative to the work field 304 and/or vice versa, and similarly, in some systems 300, the computer-readable instructions, when executed, may further cause the controller to determine, or acquire, a position and/or an orientation of the camera system 308 relative to the work field 304 and/or vice versa.

In some such examples, one or both of the camera system 308 and the work field 304 may be positioned in known or determined positions, with the controller 310 of a system 300, for example, taking into account the known or determined positions when determining whether the object 302 has one or more predetermined features. This may include determining and/or establishing a coordinate system that describes a location and/or an orientation of the system 300, determining and/or establishing a coordinate system that describes a location and/or an orientation of the work field 304, determining and/or establishing a coordinate system that describes a location and/or an orientation of the camera system 308, and/or determining and/or establishing a relationship, an offset, and/or a difference between two or more of the coordinate systems.

For example, one or both of the camera system 308 and the work field 304 may be associated with or monitored by a positioning system, such as an indoor positioning system within a manufacturing or production environment, that is configured to detect the precise position of the camera system 308 and/or the work field 304. Additionally or alternatively, camera system 308 may be fixed in space, and the work field 304 may be moved into the field of view of the camera system 308, with the work field 304 being accurately located via precision tooling or loosely located with a global resync operation performed by the system 300 with either a vision system or a touch probe, for example. Alternatively, the work field 304 may be fixed in space, and the camera system 308 may be moved such that the work field 304 is within the field of view of the camera system 308, with the camera system 308 being accurately located via precision tooling or loosely located with a global resync operation performed by the system 300 with either a vision system or a touch probe, for example. Alternatively, a mathematical model, or description, of the work field 304 may be utilized to estimate, to establish, and/or to determine a relative orientation between the camera system 308 and the work field 304. This mathematical model, or description, of the work field 304 may include and/or be a CAD model of the work field 304 or a 2-D projection of the CAD model of the work field 304, for example.

In some examples of methods 100 and systems 300, the camera system 308 is supported by a camera mount 312, such as a robotic arm. That is, the camera system 308 may be mounted to, mounted with, or mounted as, an end effector of a robotic arm. In some such systems 300, the controller 310 is communicatively coupled to the camera mount to receive location and orientation of the camera system 308 relative to the work field 304. As discussed, taking into account, knowing, determining, and/or quantifying the location and orientation of the camera system 308 relative to the work field 304 facilitates analysis of the image data for making the determination of whether the object 302 has a specific feature.

In some examples of methods 100 and systems 300, the image data comprises color data. For example, a feature 306 may be a specific color. However, in applications where color of the object is not needed or otherwise indicative of whether or not the object 302 corresponds to a desired object, then the image data may not comprise color data. In such examples, the camera system 308 therefore may capture black and white or greyscale data.

Some methods 100 further comprise illuminating 108 the work field 304 during the capturing 102, as schematically represented in FIG. 1. Accordingly, some systems 300 may further comprise an illumination device 314 that is configured to illuminate the work field 304 when the camera system 308 captures the image data, as schematically represented in FIG. 2. For example, the illumination device 314 may comprise a flash device that is communicatively coupled to, or a component of, the camera system 308, such that the flash illuminates the work field 304 when the camera system 308 captures the image data.

As schematically represented in FIG. 1, some methods 100 further comprise following the capturing 102 the image data and prior to the applying 104 the filter, subtracting 110, from the image data, data corresponding to portions of the work field 304 that are not the object 302 based on a known color of the portions of the work field 304 that are not the object 302. In corresponding systems 300, the computer-readable instructions, when executed, therefore further cause the controller to subtract data corresponding to portions of the work field 304 that are not the object 302. For example, in some applications, the work field 304 may be uniform in color other than one or more objects 302 present within the work field 304. As a more specific example, the work field 304 may comprise a sheet material in a raw or painted state, with the raw or painted state having a specific color. Accordingly the data associated with the specific color may be subtracted from the image data, so that only, or generally only, data associated with one or more objects 302 within the work field 304 remains. The subtracting of color data additionally or alternatively may be described as chroma keying.

Some methods 100 further comprise following the capturing 102 the image data and prior to the applying 104 the filter, transforming 112 the image data into HSV (hue, saturation, value) domain. In corresponding systems 300, the computer-readable instructions, when executed, therefore further cause the controller to transform the image data into HSV domain prior to application of the filter. While not required in all methods 100 and systems 300, such transformation of the image data into HSV domain may facilitate the subtraction of color data associated with the portions of the work field 304 that are not an object 302.

Additionally or alternatively, some methods 100 further comprise following the capturing 102 the image data and prior to the applying 104 the filter, binary thresholding 114 the image data based on a presumed feature of the one or more predetermined features 306, and responsive to the binary thresholding 114, identifying 116 one or more groups of pixels as candidates for the presumed feature. In corresponding systems 300, the computer-readable instructions, when executed, therefore further cause the controller to binary threshold the image data based on a presumed feature of the one or more predetermined features 306 prior to application of the filter, and responsive to the image data being binary thresholded, identify one or more groups of pixels as candidates for the presumed feature. As illustrative, non-exclusive examples, the presumed feature may be one or more of a color, a shape, a size, indicia, and a thread configuration associated with an object that is expected to be within, or desired to be within, the work field 304. In some examples, the presumed feature corresponds to an expected or desired object to be within the work field 304 based on a database associated with the work field 304. For example, a product being assembled or manufactured may have a parts list saved within the database, in which features of the parts are identified. Accordingly, if an object that is expected, or desired, to be within the work field 304 has a presumed feature, such as a specific color, then the binary thresholding 114 based on the presumed feature facilitates the identification of pixels, or a subset of the image data, as candidates for the presumed feature. As a more specific example, a fastener, or portion of a fastener, that is intended to be used in a specific assembly of a product may have a specific color. By binary thresholding the image data based on the specific color, specific groups of pixels corresponding to the specific color are identified within the image data for further processing for the ultimate determination of whether or not the object 302 is in fact the object that is desired to be present, or whether or not the object 302 is in a desired configuration, such as being fully installed, properly positioned, assembled with a distinct component, etc.

Some such methods 100 further comprise noise filtering 118 (i.e., apply a noise filter (e.g., a binary noise filter) to) the image data following the binary thresholding 114, in which case, the identifying 116 the one or more groups of pixels is further responsive to the noise filtering 118. In corresponding systems 300, the computer-readable instructions, when executed, therefore further cause the controller to noise filter (i.e., apply a noise filter (e.g., a binary noise filter) to) the image data after the image data is binary thresholded, and identification of the one or more groups of pixels is further responsive to the image data being noise filtered. For example, depending on whether or not the work field 304 was illuminated and/or on the degree or quality of illumination of the work field 304, the image data following the binary thresholding 114 may be noisy, and noise filtering 118 may clean up the image data and facilitate the ultimate determination of whether or not the object 302 is in fact the object that is desired to be present, or whether or not the object 302 is in a desired configuration, such as being fully installed, properly positioned, assembled with a distinct component, etc.

In some methods 100 and systems 300, the specific feature, the presence of which is being determined and which corresponds to an aspect of the filter being applied to the image data when creating the filtered image data, is a presumed texture of the one or more predetermined features. In some such examples, the presumed texture corresponds to an expected or desired object to be within the work field 304 based on a database associated with the work field 304. For example, and as discussed, a product being assembled or manufactured may have a parts list saved within the database, in which features of the parts are identified. Accordingly, if an object that is expected, or desired, to be within the work field 304 has a presumed feature, such as a specific texture, then the application of the filter facilitates the ultimate determination of whether or not the object 302 has the presumed feature. As a more specific example, a fastener that is intended to be used in a specific assembly of a product may have threads that give the fastener a texture corresponding to the specific thread size, or pitch.

In some examples of methods 100 and systems 300, the filter is a Gabor filter. For example, for a thread pitch associated with a desired fastener, and based on relative and/or absolute position and/or orientation data associated with the work field 304 and/or the camera system 308 (e.g., known or acquired during a method 100 and/or by a system 300), an appropriate Gabor filter may be selected, or derived, and applied to the image data, such as to the one or more groups of pixels that were identified as a result of the binary thresholding 114. The greater the response of the Gabor filter to the group(s) of pixels, the greater the confidence that a group of pixels actually represents a feature (e.g., a specific thread pitch) of an object that is desired to be within the work field 304.

As an illustrative, non-exclusive example, the desired fastener may have a known thread pitch, which may be defined along a longitudinal axis of the known fastener. A location of the object 302 within the system 300, within the work field 304, and/or relative to the camera system 308 may be known and/or acquired (such as discussed herein during methods 100 and/or utilizing systems 300). This known thread pitch, which may exhibit a corresponding known wavelength, may be scaled, such as via a perspective projection of the object 302, based upon the location of the object 302 to generate a scaled wavelength. This scaled wavelength then may be utilized to create, generate, and/or select a Gabor filter, or a family of directional Gabor filters. The Gabor filter, or the family of directional Gabor filters, then may be applied to the image data. If the image data includes the desired fastener (i.e., if the object 302 is the desired fastener), which has the known thread pitch, the Gabor filter will exhibit a strong response. Conversely, if the image data does not include the desired fastener (i.e., if the object 302 is not the desired fastener), which has the known thread pitch, the Gabor filter will exhibit a weak, or a weaker, response.

As another illustrative, non-exclusive example, a longitudinal axis of the object 302 may be oriented at an angle relative, or with respect to, an imaging plane of the camera system 308. Under these conditions, the above-described scaled wavelength further may be multiplied by an angular correction factor to produce and/or generate an angle-corrected and scaled wavelength. This angle-corrected and scaled wavelength then may be utilized to create, generate, and/or select the Gabor filter, or the family of directional Gabor filters, which may be applied to the image data, as discussed above. An example of the angular correction factor includes, or is, a cosine of the angle at which the longitudinal axis of the object 302 is oriented relative to the imaging plane.

As yet another illustrative, non-exclusive example, the camera system 308 may be rotated about the object 302, about a location of the object 302, and/or about the longitudinal axis of the object 302. This rotation of the camera system 308 causes a rotation of the image plane, thereby providing three-dimensional information about the object 302 and permitting systems 300 to utilize the family directional Gabor filters.

In some methods 100 and systems 300, the filtered data comprises, or may be described as, one or more blobs of pixels that are candidates for being representative of the object 302. Some such methods 100 further comprise, following the applying 104 the filter, analyzing 120 the one or more blobs (i.e., localized grouping) of pixels to determine presence of one or more blob features. In corresponding systems 300, the computer-readable instructions, when executed, therefore further cause the controller to analyze the one or more blobs of pixels to determine presence of one or more blob features following application of the filter. For example, the one or more blob features may comprise one or more of blob area, blob eccentricity, blob dimensions, blob brightness, blob correlation, and blob homogeneity. In some such methods 100 and systems 300, the one or more blob features are associated with the one or more predetermined features 306 in a database associated with the work field 304. As discussed, a product being assembled or manufactured may have a parts list saved within the database, in which features of the parts are identified. Accordingly, if an object that is expected, or desired, to be within the work field 304 has a presumed feature that corresponds to an expected area, eccentricity, dimension, brightness, correlation, and/or homogeneity of the one or more blobs, then the analysis of the one or more blobs facilitates the ultimate determination of whether or not the object 302 has the one or more predetermined features.

Some such methods 100 further comprise training 122 a machine learning model to identify the one or more predetermined features 306 associated with the one or more blob features. In corresponding systems 300, the computer-readable instructions, when executed, therefore further cause the controller to train a machine learning model to identify the one or more predetermined features 306 associated with the one or more blob features. As an illustrative, non-exclusive example, the machine learning model may be a support vector machine (SVM).

In some methods 100 and systems 300, the camera system 308 is a stereo camera system, and therefore the image data comprises two images. Such methods 100 further comprise creating 124 a point cloud of the filtered data. In corresponding systems 300, the computer-readable instructions, when executed, therefore further cause the controller 310 to create a point cloud of the filtered data.

Some such methods 100 further comprise during the capturing 102 the image data, projecting 126 a light texture on the work field 304. Corresponding systems 300 further comprise a projector 316 that is configured to project a light texture on the work field 304. In some such methods 100 and systems 300, the light texture comprises a pattern, while in other such methods 100 and systems 300, the light texture is random. By projecting a light texture on the work field 304, the two images captured by the camera system 308 may be resolved to create the point cloud. For example, in some methods 100, creating 124 the point cloud may comprise generating 128 a disparity map from the two images based on the light texture.

More specifically, some methods 100 further comprise selecting 130 pixels associated with the object 302, and comparing 132 the pixels associated with the object 302 to a computer model (e.g., a CAD model) of an expected or desired object from a database associated with the work field 304. In corresponding systems 300, the computer-readable instructions, when executed, therefore further cause the controller to select pixels associated with the object 302, and compare the pixels associated with the object 302 to a computer model of an expected or desired object from a database associated with the work field 304. As an illustrative, non-exclusive example, a computer model of a fastener may include a representation of a cylinder corresponding to the shaft of the fastener, and comparing the computer model with the pixels associated with the object 302 may include fitting the cylinder to the pixels by using normal and radius estimates.

In some applications, the work field 304 comprises a plurality of objects 302. Accordingly, some methods 100 are performed in connection with each of the plurality of objects. In corresponding systems 300, the computer-readable instructions, when executed, therefore further cause the controller 310 to determine if each of the plurality of objects 302 has the specific feature.

With continued reference to FIGS. 1 and 2, also within the scope of the present disclosure are robotic installation methods 200 and robotic installation systems 400. As schematically represented in FIG. 1 and with general reference to FIG. 2, robotic installation methods 200 comprise performing an automated machine vision method 100 according to the present disclosure, in which the camera system 308 is mounted to, mounted with, or mounted as an end effector of a robotic arm 402, and based on the determining 106 of the performed method 100, instructing 202 the robotic arm 402 to install a component in a predetermined configuration relative to the object 302, and installing 204, using the robotic arm 402, the component in the predetermined configuration relative to the object 302. As schematically represented in FIG. 2, robotic installation systems 400 comprise a machine vision system 300 according to the present disclosure, and a robotic arm 402, in which the camera system 308 is mounted to, mounted with, or mounted as an end effector of the robotic arm 402, and in which the robotic arm 402 is configured to install a component in a predetermined configuration relative to the object 302 based in part on a determination by the controller 310 if the object 302 has the specific feature and instructions received from the controller 310. That is, the computer-readable instructions, when executed, further cause the controller to instruct the robotic arm to install the component in the predetermined configuration relative to the object.

Figure 3:
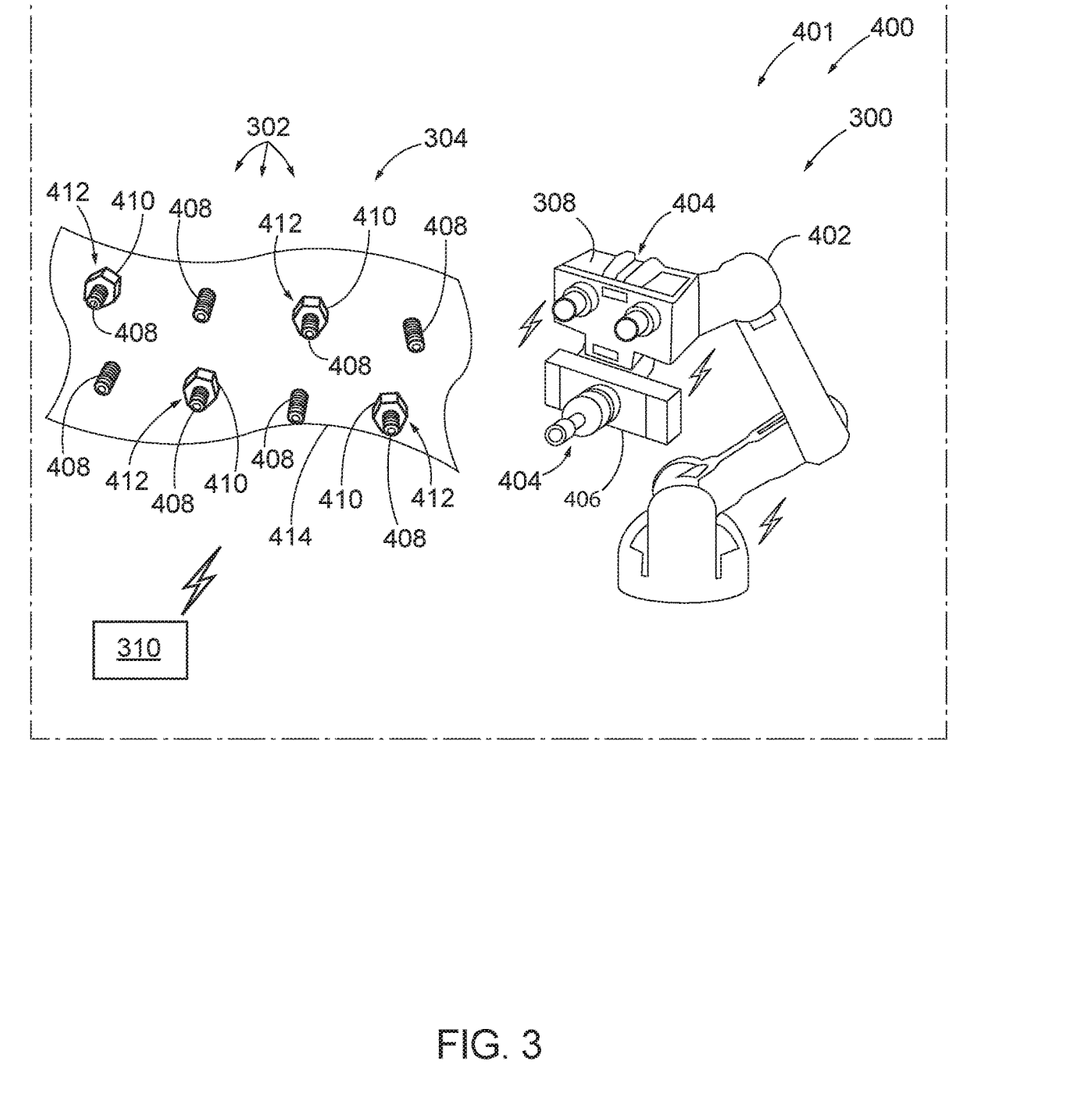
FIG. 3 is a somewhat schematic illustration representing an example robotic installation system according to the present disclosure.

Turning now to FIG. 3, an illustrative non-exclusive example of a robotic installation system 400 in the form of robotic installation system 401 is illustrated. Where appropriate, the reference numerals from the schematic illustration of FIG. 2 are used to designate corresponding parts of robotic installation system 401; however, the example of FIG. 3 is non-exclusive and does not limit robotic installation systems 400 to the illustrated embodiment of FIG. 3. That is, robotic installation systems 400 are not limited to the specific embodiment of the illustrated robotic installation system 401, and robotic installation systems 400 may incorporate any number of the various aspects, configurations, characteristics, properties, etc. of robotic installation systems 400 that are illustrated in and discussed with reference to the schematic representation of FIG. 2 and/or the embodiments of FIG. 3, as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to robotic installation system 401; however, it is within the scope of the present disclosure that the previously discussed features, variants, etc. may be utilized with robotic installation system 401.

As illustrated in FIG. 3, robotic installation system 401 comprises a robotic arm 402 having as end effectors 404, a camera system 308 and a nut runner 406. The robotic arm 402 is positioned relative to work field 304 that comprises a plurality of objects 302 in the form of fasteners extending from a sheet material 414. More specifically, in the depicted example, a plurality of bolts 408 extend through the sheet material 414, with a subset of the bolts 408 having nuts 410 installed thereon and defining a fastener pair 412. A controller 310 is schematically presented in communication with the camera system 308, the nut runner 406, and the robotic arm 402, with this operative communication schematically represented by lightning bolts and which communication may be wired and/or wireless. Accordingly, robotic installation system 401 is configured to perform methods 100 and methods 200 according to the present disclosure. More specifically, robotic installation system 401 utilizes its machine vision system 300 to determine if the objects 302 having one or more predetermined features, such as whether the correct bolts 408 and nuts 410 are present, whether a bolt 408 is correctly or fully positioned for operative receipt of a nut 410, whether a nut is properly and operatively positioned on a corresponding bolt 408, which bolts 408 still need nuts 410, etc. Then, based on such determination, the robotic arm 402 may operatively install additional nuts 410 utilizing the nut runner 406 and/or may not install a nut 410, for example, where an incorrect bolt 408 is positioned or where a bolt 408 is not operatively positioned to receive a nut 410.

Figure 4:
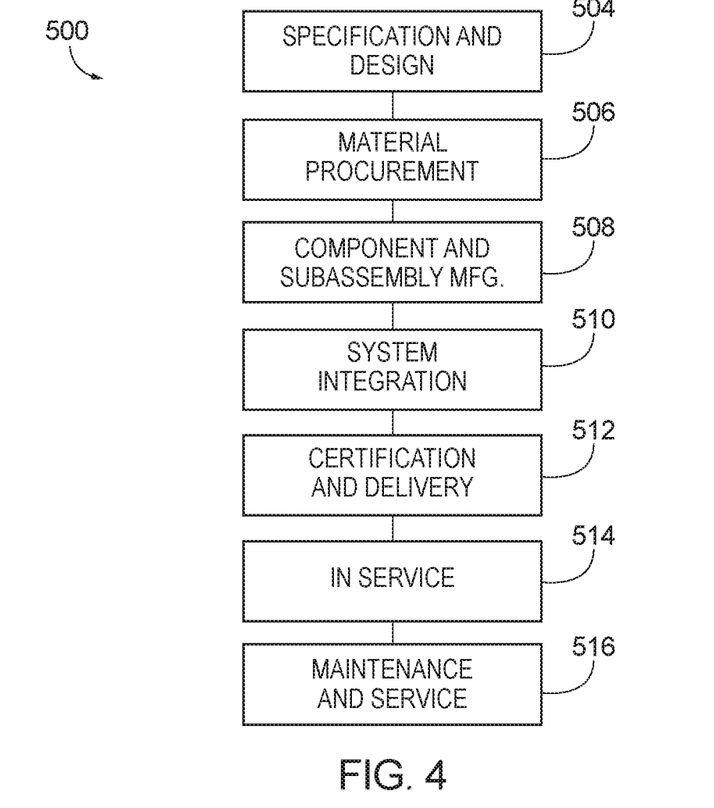
FIG. 4 is a flowchart schematically representing aircraft production and service methodology.
Figure 5:
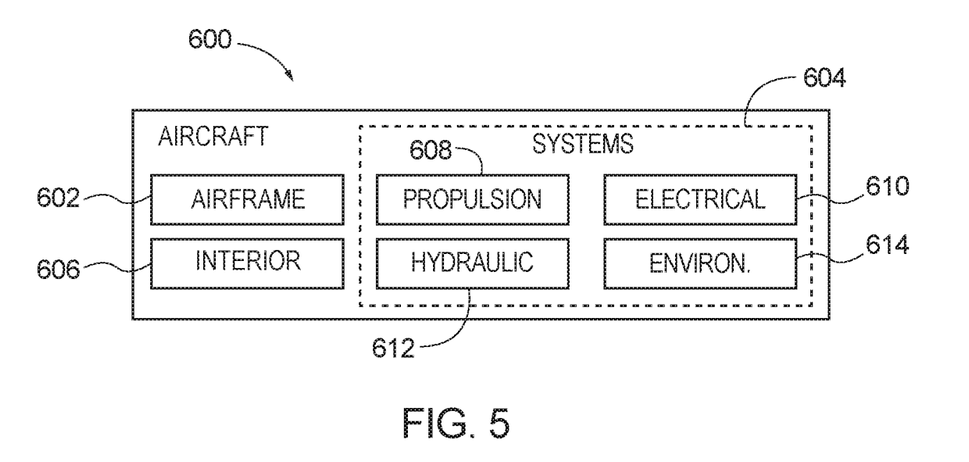
FIG. 5 is a block diagram schematically representing an aircraft.

Turning now to FIGS. 4 and 5, embodiments of the present disclosure may be described in the context of an aircraft manufacturing and service method 500 as shown in FIG. 4 and an aircraft 600 as shown in FIG. 5. That is, a method 500 may include one or more of a method 100 or method 200 according to the present disclosure, and an aircraft 600 may be manufactured or serviced utilizing a system 300 or a system 400 according to the present disclosure, with the aircraft 600 comprising a work field 304, for example.

During pre-production, exemplary method 500 may include specification and design 504 of the aircraft 600 and material procurement 506. During production, component and subassembly manufacturing 508 and system integration 510 of the aircraft 600 takes place. Thereafter, the aircraft 600 may go through certification and delivery 512 in order to be placed in service 514. While in service by a customer, the aircraft 600 is scheduled for routine maintenance and service 516 (which may also include modification, reconfiguration, refurbishment, and so on).

Each of the processes of method 500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 5, the aircraft 600 produced by exemplary method 500 may include an airframe 602 with a plurality of systems 604 and an interior 606. Examples of high-level systems 604 include one or more of a propulsion system 608, an electrical system 610, a hydraulic system 612, and an environmental system 614. Any number of other systems also may be included. Although an aerospace example is shown, the principles of the inventions disclosed herein may be applied to other industries, such as the automotive industry.

Apparatus and methods disclosed herein may be employed during any one or more of the stages of the production and service method 500. For example, components or subassemblies corresponding to production stage 508 may be fabricated or manufactured in a manner similar to components or subassemblies produced while the aircraft 600 is in service. Also, one or more apparatus embodiments, method embodiments, or a combination thereof may be utilized during the production stages 508 and 510, for example, by substantially expediting assembly of or reducing the cost of an aircraft 600. Similarly, one or more of apparatus embodiments, method embodiments, or a combination thereof may be utilized while the aircraft 600 is in service, for example and without limitation, to maintenance and service 516.

Illustrative, non-exclusive examples of inventive subject matter according to the present disclosure are described in the following enumerated paragraphs:

A. An automated machine vision method for determining if an object within a work field has one or more predetermined features, the automated machine vision method comprising:

capturing image data of the work field from a camera system;

applying a filter to the image data to create filtered data, wherein the filter comprises an aspect corresponding to a specific feature of the one or more predetermined features; and based at least in part on the applying, determining if the object has the specific feature.

A1. The automated machine vision method of paragraph A, wherein at least one of:

(i) the camera system is positioned in a known position and orientation relative to the work field; and (ii) the automated machine vision method further comprises determining a relative orientation between the camera system and the work field.

A2. The automated machine vision method of any of paragraphs A-A1, wherein the camera system is mounted to, mounted with, or mounted as, an end effector of a robotic arm.

A3. The automated machine vision method of any of paragraphs A-A2, wherein the image data comprises color data.

A4. The automated machine vision method of any of paragraphs A-A3, further comprising: illuminating the work field during the capturing.

A5. The automated machine vision method of any of paragraphs A-A4, further comprising following the capturing the image data and prior to the applying the filter:

subtracting, from the image data, data corresponding to portions of the work field that are not the object based on a known color of the portions of the work field that are not the object.

A6. The automated machine vision method of any of paragraphs A-A5, further comprising following the capturing the image data and prior to the applying the filter:

transforming the image data into HSV domain.

A7. The automated machine vision method of any of paragraphs A-A6, further comprising following the capturing the image data and prior to the applying the filter:

binary thresholding the image data based on a presumed feature of the one or more predetermined features; and responsive to the binary thresholding, identifying one or more groups of pixels as candidates for the presumed feature.

A7.1. The automated machine vision method of paragraph A7, wherein the presumed feature corresponds to an expected or desired object to be within the work field based on a database associated with the work field.

A7.2. The automated machine vision method of any of paragraphs A7-A7.1, wherein the presumed feature is one or more of a color, a shape, a size, indicia, and a thread configuration.

A7.3. The automated machine vision method of any of paragraphs A7-A7.2, further comprising:

noise filtering the image data following the binary thresholding;

wherein the identifying the one or more groups of pixels is further responsive to the noise filtering.

A8. The automated machine vision method of any of paragraphs A-A7.3, wherein the specific feature is a presumed texture of the one or more predetermined features.

A8.1. The automated machine vision method of paragraph A8, wherein the presumed texture corresponds to an/the expected or desired object to be within the work field based on a/the database associated with the work field.

A8.2. The automated machine vision method of any of paragraphs A8-A8.1, wherein the presumed texture corresponds to a fastener thread size.

A9. The automated machine vision method of any of paragraphs A-A8.2, wherein the filter is a Gabor filter.

A10. The automated machine vision method of any of paragraphs A-A9, wherein the filtered data comprises one or more blobs of pixels that are candidates for being representative of the object.

A10.1. The automated machine vision method of paragraph A10, further comprising:

following the applying the filter, analyzing the one or more blobs of pixels to determine presence of one or more blob features.

A10.1.1. The automated machine vision method of paragraph A10.1, wherein the one or more blob features comprise one or more of blob area, blob eccentricity, blob dimensions, blob brightness, blob correlation, and blob homogeneity.

A10.1.1.1. The automated machine vision method of paragraph A10.1.1, wherein the one or more blob features are associated with the one or more predetermined features in a/the database associated with the work field.

A10.1.2. The automated machine vision method of any of paragraphs A10-A10.1.1.1, further comprising:

training a machine learning model to identify the one or more predetermined features associated with the one or more blob features.

A11. The automated machine vision method of any of paragraphs A-A10.1.2, wherein the camera system is a stereo camera system, wherein the image data comprises two images, and wherein the automated machine vision method further comprises:

creating a point cloud of the filtered data.

A11.1. The automated machine vision method of paragraph A11, further comprising:

during the capturing the image data, projecting a light texture on the work field.

A11.1.1. The automated machine vision method of paragraph A11.1, wherein the light texture comprises a pattern.

A11.1.2. The automated machine vision method of paragraph A11.1, wherein the light texture is random.

A11.1.3. The automated machine vision method of any of paragraphs A11.1-A11.1.2, wherein the creating the point cloud comprises generating a disparity map from the two images based on the light texture.

A11.1.3.1 The automated machine vision method of paragraph A11.1.3, further comprising:
 selecting pixels associated with the object; and
 comparing the pixels associated with the object to a computer model of an/the expected or desired object from a/the database associated with the work field.

A12. The automated machine vision method of any of paragraphs A-A11.1.3.1, wherein the object comprises a fastener or fastener pair.

A13. The automated machine vision method of any of paragraphs A-A12, wherein the work field comprises a plurality of objects, and wherein the method is performed in connection with each of the plurality of objects.

A14. The automated machine vision method of any of paragraphs A-A13, wherein the work field comprises a plurality of objects extending from a sheet material.

A14.1. The automated machine vision method of paragraph A14 when depending from paragraph A5, wherein the portions of the work field that are not the object correspond to the sheet material.

A15. The automated machine vision method of any of paragraphs A-A14.1, wherein the one or more predetermined features comprise one or more of a color, a size, a shape, indicia, and a thread configuration.

A16. The automated machine vision method of any of paragraphs A-A15, performed by the machine vision system of any of paragraphs C-C15.

B. A robotic installation method, comprising:
 performing the automated machine vision method of any of paragraphs A-A16, wherein the camera system is mounted to, mounted with, or mounted as an/the end effector of a/the robotic arm;
 based on the determining, instructing the robotic arm to install a component in a predetermined configuration relative to the object; and
 installing, using the robotic arm, the component in the predetermined configuration relative to the object.

B1. The robotic installation method of paragraph B, wherein the object and the component comprise a/the fastener pair.

C. A machine vision system for determining if an object within a work field has one or more predetermined features, the machine vision system comprising:
 a camera system configured to capture image data of the work field; and
 a controller communicatively coupled to the camera system to receive the image data from the camera system, wherein the controller comprises non-transitory computer readable media having computer-readable instructions that, when executed, cause the controller to:
  apply a filter to the image data to create filtered data, wherein the filter comprises an aspect corresponding to a specific feature of the one or more predetermined features; and
  based at least in part on application of the filter, determine if the object has the specific feature.

C1. The machine vision system of paragraph C, further comprising:
 a camera mount, wherein the camera system is supported by the camera mount;
 wherein the controller is communicatively coupled to the camera mount to receive location and orientation data of the camera system relative to the work field.

C1.1. The machine vision system of paragraph C1, wherein the camera mount is a robotic arm.

C2. The machine vision system of any of paragraphs C-C1.1, wherein the image data comprises color data.

C3. The machine vision system of any of paragraphs C-C2, further comprising:
 an illumination device configured to illuminate the work field when the camera system captures the image data.

C4. The machine vision system of any of paragraphs C-C3, wherein the computer-readable instructions, when executed, further cause the controller to:
 prior to application of the filter, subtract, from the image data, data corresponding to portions of the work field that are not the object based on a known color of the portions of the work field that are not the object.

C5. The machine vision system of any of paragraphs C-C4, wherein the computer-readable instructions, when executed, further cause the controller to:
 prior to application of the filter, transform the image data into HSV domain.

C6. The machine vision system of any of paragraphs C-C5, wherein the computer-readable instructions, when executed, further cause the controller to:
 prior to application of the filter, binary threshold the image data based on a presumed feature of the one or more predetermined features; and
 responsive to the image data being binary thresholded, identify one or more groups of pixels as candidates for the presumed feature.

C6.1. The machine vision system of paragraph C6, wherein the presumed feature corresponds to an expected or desired object to be within the work field based on a database associated with the work field.

C6.2. The machine vision system of any of paragraphs C6-C6.1, wherein the presumed feature is one or more of a color, a shape, a size, indicia, and a thread configuration.

C6.3. The machine vision system of any of paragraphs C6-C6.2, wherein the computer-readable instructions, when executed, further cause the controller to:
 noise filter the image data after the image data is binary thresholded;
 wherein identification of the one or more groups of pixels is further responsive to the image data being noise filtered.

C7. The machine vision system of any of paragraphs C-C6.3, wherein the specific feature is a presumed texture of the one or more predetermined features.

C7.1. The machine vision system of paragraph C7, wherein the presumed texture corresponds to an/the expected or desired object to be within the work field based on a/the database associated with the work field.

C7.2. The machine vision system of any of paragraphs C7-C7.1, wherein the presumed texture corresponds to a fastener thread size.

C8. The machine vision system of any of paragraphs C-C7.2, wherein the filter is a Gabor filter.

C9. The machine vision system of any of paragraphs C-C8, wherein the filtered data comprises one or more blobs of pixels that are candidates for being representative of the object.

C9.1. The machine vision system of paragraph C9, wherein the computer-readable instructions, when executed, further cause the controller to:

following application of the filter, analyze the one or more of blobs of pixels to determine presence of one or more blob features.

C9.1.1. The machine vision system of paragraph C9.1, wherein the one or more blob features comprise one or more of blob area, blob eccentricity, blob dimensions, blob brightness, blob correlation, and blob homogeneity.

C9.1.1.1. The machine vision system of paragraph C9.1.1, wherein the one or more blob features are associated with the one or more predetermined features in a/the database associated with the work field.

C9.1.2. The machine vision system of any of paragraphs C9-C9.1.1.1, wherein the computer-readable instructions, when executed, further cause the controller to:

train a machine learning model to identify the one or more predetermined features associated with the one or more blob features.

C10. The machine vision system of any of paragraphs C-C9.1.2, wherein the camera system is a stereo camera system, wherein the image data comprises two images, and wherein the computer-readable instructions, when executed, further cause the controller to:

create a point cloud of the filtered data.

C10.1. The machine vision system of paragraph C10, further comprising:

a projector configured to project a light texture on the work field.

C10.1.1. The machine vision system of paragraph C10.1, wherein the light texture comprises a pattern.

C10.1.2. The machine vision system of paragraph C10.1, wherein the light texture is random.

C10.1.3. The machine vision system of any of paragraphs C10.1-C10.1.2, wherein creation of the point cloud comprises generation of a disparity map from the two images based on the light texture.

C10.1.3.1 The machine vision system of paragraph C10.1.3, wherein the computer-readable instructions, when executed, further cause the controller to:

select pixels associated with the object; and compare the pixels associated with the object to a computer model of an/the expected or desired object from a/the database associated with the work field.

C11. The machine vision system of any of paragraphs C-C10.1.3.1, wherein the object comprises a fastener or fastener pair.

C12. The machine vision system of any of paragraphs C-C11, wherein the work field comprises a plurality of objects, and wherein the computer-readable instructions, when executed, further cause the controller to determine if each of the plurality of objects has the specific feature.

C13. The machine vision system of any of paragraphs C-C12, wherein the work field comprises a plurality of objects extending from a sheet material.

C13.1. The machine vision system of paragraph C13 when depending from paragraph C4, wherein the portions of the work field that are not the object correspond to the sheet material.

C14. The machine vision system of any of paragraphs C-C13.1, wherein the one or more predetermined features comprise one or more of a color, a size, a shape, indicia, and a thread configuration.

C15. The machine vision system of any of paragraphs C-C14, configured to perform the automated machine vision method of any of paragraphs A-A16.

C16. The use of the machine vision system of any of paragraphs C-C15 to determine if the object within the work field has the one or more predetermined features.

D. A robotic installation system, comprising:

the machine vision system of any of paragraphs C-C15; and a/the robotic arm, wherein the camera system is mounted to, mounted with, or mounted as an end effector of the robotic arm, and wherein the robotic arm is configured to install a component in a predetermined configuration relative to the object based in part on a determination by the controller that the object has the specific feature;

wherein the computer-readable instructions, when executed, further cause the controller to instruct the robotic arm to install the component in the predetermined configuration relative to the object.

D1. The robotic installation system of paragraph D, wherein the object and the component comprise a/the fastener pair.

D2. The use of the robotic installation system of any of paragraphs D-D1 to install the component in the predetermined configuration relative to the object.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A robotic installation method, comprising:
performing an automated machine vision method for determining if an object within a work field has one or more predetermined features, the automated machine vision method comprising:
capturing image data of the work field from a camera system, wherein the camera system is mounted to, mounted with, or mounted as an end effector of a robotic arm;
following the capturing the image data, binary thresholding the image data based on a presumed feature of the one or more predetermined features, wherein the presumed feature comprises a thread pitch;
responsive to the binary thresholding, identifying one or more groups of pixels as candidates for the thread pitch;
following the identifying, applying a filter to the identified one or more groups of pixels to create filtered data, wherein the filter comprises an aspect corresponding to the thread pitch; and
based at least in part on the applying, determining if the object has the thread pitch;
based on the determining, instructing the robotic arm to install a component in a predetermined configuration relative to the object; and
installing, using the robotic arm, the component in the predetermined configuration relative to the object.

2. The robotic installation method of claim 1, wherein the object and the component comprise a fastener pair.

3. The robotic installation method of claim 1,
wherein the camera system is a stereo camera system, wherein the image data comprises two images;
wherein the filter is a Gabor filter;
wherein the filtered data comprises one or more blobs of pixels that are candidates for being representative of the object; and
wherein the performing the automated machine vision method further comprises:
during the capturing the image data, projecting a light texture on the work field;
following the applying the filter, analyzing the one or more blobs of pixels to determine presence of one or more blob features, wherein the one or more blob features comprise one or more of blob area, blob eccentricity, blob dimensions, blob brightness, blob correlation, and blob homogeneity;
creating a point cloud of the filtered data, wherein the creating the point cloud comprises generating a disparity map from the two images based on the light texture;
selecting pixels associated with the object; and
comparing the pixels associated with the object to a computer model of an expected or desired object from a database associated with the work field.

4. An automated machine vision method for determining if an object within a work field has one or more predetermined features, the automated machine vision method comprising:
capturing image data of the work field from a camera system;
following the capturing the image data, binary thresholding the image data based on a presumed feature of the one or more predetermined features, wherein the presumed feature comprises a thread pitch;
responsive to the binary thresholding, identifying one or more groups of pixels as candidates for the thread pitch;
following the identifying, applying a filter to the identified one or more groups of pixels to create filtered data, wherein the filter comprises an aspect corresponding to the thread pitch; and
based at least in part on the applying, determining if the object has the thread pitch.

5. The automated machine vision method of claim 4, wherein at least one of:
(i) the camera system is positioned in a known position and orientation relative to the work field; and
(ii) the automated machine vision method further comprises determining a relative orientation between the camera system and the work field.

6. The automated machine vision method of claim 4, further comprising following the capturing the image data and prior to the applying the filter:
transforming the image data into HSV domain; and
subtracting, from the image data, data corresponding to portions of the work field that are not the object based on a known color of the portions of the work field that are not the object.

7. The automated machine vision method of claim 4, wherein the presumed feature corresponds to an expected or desired object to be within the work field based on a database associated with the work field.

8. The automated machine vision method of claim 4, further comprising:
noise filtering the image data following the binary thresholding;
wherein the identifying the one or more groups of pixels is further responsive to the noise filtering.

9. The automated machine vision method of claim 4, wherein the thread pitch corresponds to an expected or desired object to be within the work field based on a database associated with the work field.

10. The automated machine vision method of claim 4, wherein the filter is a Gabor filter.

11. The automated machine vision method of claim 4, wherein the filtered data comprises one or more blobs of pixels that are candidates for being representative of the object, and wherein the automated machine vision method further comprises:
following the applying the filter, analyzing the one or more blobs of pixels to determine presence of one or more blob features, wherein the one or more blob features comprise one or more of blob area, blob eccentricity, blob dimensions, blob brightness, blob correlation, and blob homogeneity.

12. The automated machine vision method of claim 11, wherein the one or more blob features are associated with the one or more predetermined features in a database associated with the work field.

13. The automated machine vision method of claim 4, wherein the camera system is a stereo camera system, wherein the image data comprises two images, and wherein the automated machine vision method further comprises:
during the capturing the image data, projecting a light texture on the work field;
creating a point cloud of the filtered data, wherein the creating the point cloud comprises generating a disparity map from the two images based on the light texture;
selecting pixels associated with the object; and comparing the pixels associated with the object to a computer model of an expected or desired object from a database associated with the work field.

14. The automated machine vision method of claim 4, wherein the object comprises a fastener or fastener pair.

15. A machine vision system for determining if an object within a work field has one or more predetermined features, the machine vision system comprising:
a camera system configured to capture image data of the work field; and
a controller communicatively coupled to the camera system to receive the image data from the camera system, wherein the controller comprises non-transitory computer readable media having computer-readable instructions that, when executed, cause the controller to:
binary threshold the image data based on a presumed feature of the one or more predetermined features, wherein the presumed feature comprises a thread pitch;
responsive to binary thresholding the image data, identify one or more groups of pixels as candidates for the thread pitch;
following the identification of the one or more groups of pixels, apply a filter to the identified one or more groups of pixels to create filtered data, wherein the filter comprises an aspect corresponding to the thread pitch; and
based at least in part on application of the filter, determine if the object has the thread pitch.

16. A robotic installation system, comprising:
the machine vision system of claim 15; and
a robotic arm, wherein the camera system is mounted to, mounted with, or mounted as an end effector of the robotic arm, and wherein the robotic arm is configured to install a component in a predetermined configuration relative to the object based in part on a determination by the controller that the object has the thread pitch;
wherein the computer-readable instructions, when executed, further cause the controller to instruct the robotic arm to install the component in the predetermined configuration relative to the object.

17. The machine vision system of claim 15, wherein at least one of:
(i) the camera system is positioned in a known position and orientation relative to the work field; and
(ii) the computer-readable instructions, when executed, further cause the controller to determine a relative orientation between the camera system and the work field.

18. The machine vision system of claim 15, wherein the computer-readable instructions, when executed, further cause the controller, following capturing the image data and prior to application of the filter, to:
transform the image data into HSV domain; and
subtract, from the image data, data corresponding to portions of the work field that are not the object based on a known color of the portions of the work field that are not the object.

19. The machine vision system of claim 15, wherein the computer-readable instructions, when executed, further cause the controller to noise filter the image data following binary thresholding, and wherein identification of the one or more groups of pixels is further responsive to noise filtering.

20. The machine vision system of claim 15, wherein the filter is a Gabor filter.

* * * * *